No. 745,514. PATENTED DEC. 1, 1903.
J. OLSEN & E. I. NOXON.
DRYING APPARATUS.
APPLICATION FILED APR. 2, 1903.
NO MODEL.

No. 745,514.                                          Patented December 1, 1903.

UNITED STATES PATENT OFFICE.

JOHN OLSEN, OF MILWAUKEE, WISCONSIN, AND ELWIN I. NOXON, OF CHICAGO, ILLINOIS.

DRYING APPARATUS.

SPECIFICATION forming part of Letters Patent No. 745,514, dated December 1, 1903.

Application filed April 2, 1903. Serial No. 150,706. (No model.)

*To all whom it may concern:*

Be it known that we, JOHN OLSEN, a subject of the King of Sweden and Norway, residing at Milwaukee, in the county of Milwaukee and State of Wisconsin, and ELWIN I. NOXON, a citizen of the United States, residing at Chicago, in the county of Cook and State of Illinois, have invented certain new and useful Improvements in Drying Apparatus, of which the following is a specification, reference being had to the accompanying drawings, forming a part thereof.

Our invention relates to apparatus for drying grain or granular material, consisting of a series of open pans arranged one above another and each having a steam chamber or space at the bottom. Its main objects are to automatically feed and discharge the material to and from the pans and to distribute and move the same over and in contact with the heated bottoms of the pans in such a manner as to most rapidly and effectively dry the same, to provide for the expansion and contraction of the shaft which actuates the sweeps, so that they will be maintained in close contact with the bottoms of the pans without binding and the driving connection of said shaft will not be detrimentally affected, and generally to improve the construction and operation of apparatus of this class.

The invention consists in certain novel features of construction and in the peculiar arrangement and combinations of parts hereinafter particularly described and claimed.

In the accompanying drawings like letters designate the same parts in both figures.

Figure 1:
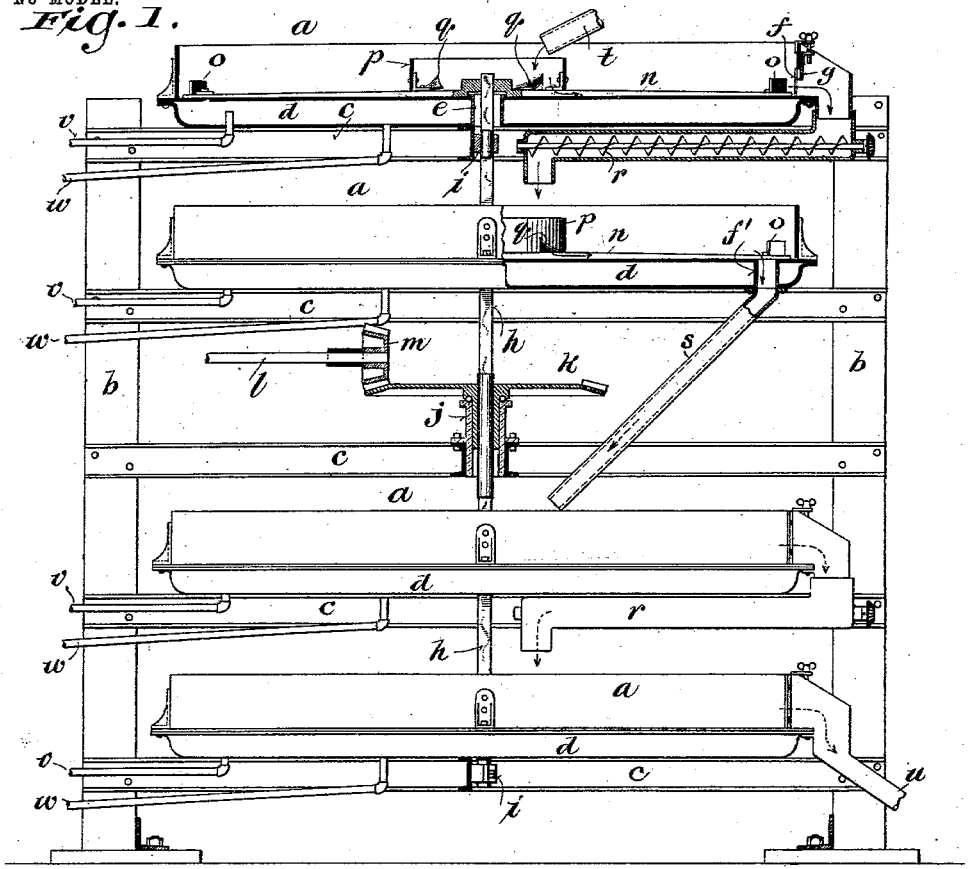
Figure 2:
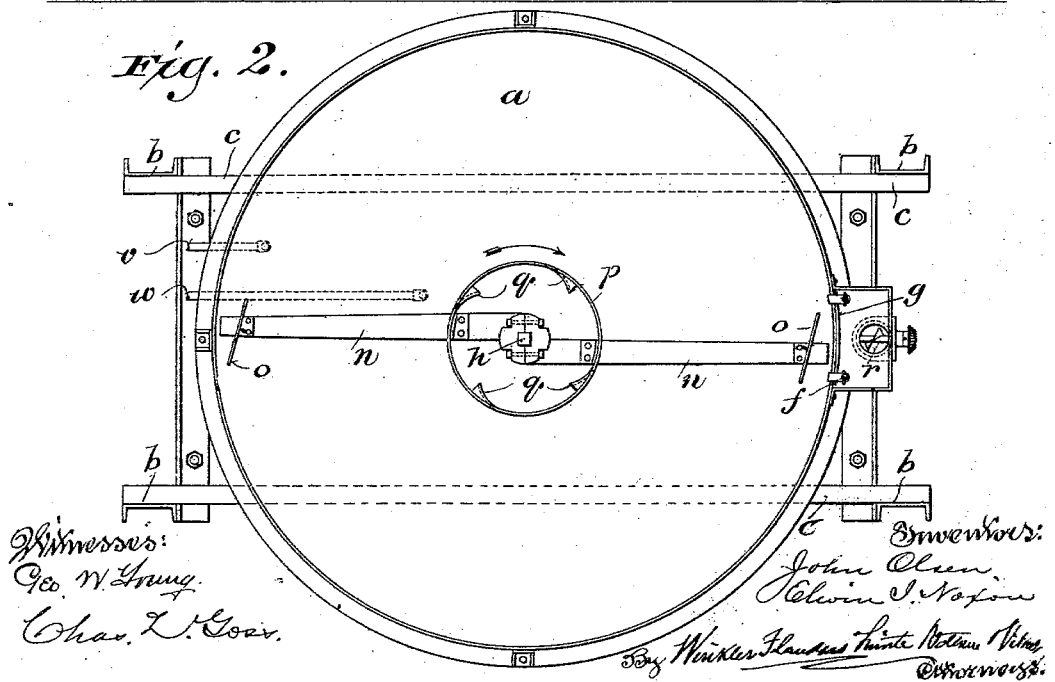

Figure 1 is a vertical central section of drying apparatus embodying our invention, and Fig. 2 is a plan view of the same.

A series of open pans $a$ $a$ are supported horizontally one above another by a suitable frame, which may be conveniently constructed of channel-iron uprights $b$ and cross-pieces $c$, as shown. Each pan is provided on the under side next to the bottom with a closed steam chamber or space $d$, through which and the bottom of the pan a central opening $e$ is made. At or near its periphery each pan is provided with a discharge-opening, as shown at $f$, in the upwardly-extending rim of the pan or at $f'$ through the bottom and steam-space inside of the rim. Each discharge-opening $f$ is provided with an adjustable gate or valve $g$ for regulating the rate of delivery of the material from one pan to another and from the last pan.

$h$ is a vertical shaft passing freely through the central openings $e$ in the several pans and provided with suitable bearings $i$ $i$ and $j$ on the frame. On this shaft is secured a bevel-gear $k$, the hub of which is preferably extended below to form a journal fitting the bearing $j$, which supports the entire weight of said shaft and gear, permitting the free expansion of the shaft above and below the bearing without affecting the position of the gear. Between the hub of the gear and the upper end of the bearing balls or rollers may be interposed, as shown, to reduce friction.

$l$ is a horizontal driving-shaft provided with a bevel-pinion $m$, meshing with the gear $k$.

$n$ $n$ are sweeps, consisting of two or more arms, which are preferably bolted together at their inner ends upon the shaft $h$, as shown in Fig. 2, and provided at or near their outer ends with adjustable flights $o$ $o$, the inclination of which to the arms of the sweeps may be varied to accelerate or retard the movement of the material on the pans and its discharge therefrom.

The shaft $h$ where it passes through the sweeps is squared, as shown, or otherwise shaped and fits loosely in the correspondingly-shaped openings in the hubs of the sweeps, so that it is capable of free endwise movement therein to allow for expansion and contraction and at the same time turn the sweeps. The sweeps are thus held by their weight in close contact with the bottoms of the pans and are prevented from binding thereon regardless of the lengthening and shortening of the shaft $h$, which is movable endwise through its bearings $i$ $i$. The hubs of the sweeps are preferably made to cover and close the central openings in the bottoms of the pans, as shown at the top of Fig. 1.

Each sweep is provided around the center with a ring $p$, into which the material to be dried is fed. This ring is formed or provided with inclined wings or flights $q$, which force the material outwardly underneath it against the bottom of the pan. The moist or but partially-dried material is thus spread out in a thin layer and brought into contact with the heated bottom of the pan as it is forced outwardly from and underneath said ring. A conveyer or spout leads from the discharge-opening of each of the other pans inwardly to a point above the ring p of the pan next below.

Where the pans can be placed close together, as at the top and bottom of the arrangement herein shown, a conveyer r is used to save room; but where there is sufficient space between adjacent pans an inclined spout s may be used, as between the pans where the driving connection is made, necessitating a greater vertical space.

The material is fed into the machine by a spout t, which opens into the ring p of the upper pan, and the material is discharged from the lower pan through a spout u. The chambers or spaces d of the several pans are supplied with steam by pipes v, and they are drained by pipes w.

Our improved machine operates as follows: The pans being heated by steam admitted to the chambers or spaces d and the sweeps n and the conveyers r set in motion, the wet or moist material to be treated is fed through the spout t into the upper ring p, and the sweeps, with their distributing-rings, being turned in the direction indicated by the arrow on Fig. 2 the material is forced by the inclined wings q downwardly and outwardly underneath the ring and spread in a thin layer over the heated bottom of the pan, upon which it is gradually moved outward by the action of the sweep until it is brought into the path of the inclined flights o, which force it out through the discharge-opening f into the upper conveyer r. This conveyer carries it back in a radial direction toward the center of the machine and discharges it into the ring p of the next pan below, where the operation is repeated. From the discharge-opening f' of the second pan the material flows by gravity through the spout s into the distributing-ring of the third pan, and so on through the machine until it is discharged in a dry condition from the bottom pan through the spout u.

Any number of pans of any suitable size, according to the quantity and nature of the material to be treated and the capacity of the apparatus required to do the work, may be arranged substantially as herein shown and described, and the driving connection may be made with any part of the vertical shaft h above or below the pans or between any two pans.

Where economy of space is essential, conveyers like or similar to the conveyers r may be employed between the several pans; but where economy of space is not essential spouts may be used and the material transferred from one pan to another by gravity.

Various modifications other than those specifically mentioned may be made in the construction and arrangement of component parts of the apparatus within the principle and intended scope of our invention.

We claim—

1. In drying apparatus the combination of a series of pans arranged one above another and each provided with a closed steam-space next to the bottom and a central opening through the bottom, a vertical shaft passing loosely through the central openings in said pans and sweeps free to slip vertically on said shaft with which they have rotating connections, and bearing on the bottoms of said pans, the hubs of the sweeps covering and closing the central openings in the pans, substantially as described.

2. In drying apparatus the combination of a series of pans arranged one above another and each provided with a closed steam-space next to the bottom and a central opening through the bottom, a vertical shaft passing freely through the central openings in said pans, a driving connection for turning said shaft, a supporting-bearing for said shaft next to its driving connection, and sweeps bearing on the bottoms of said pans and having vertically-movable rotating connections with said shaft, the hubs of the sweeps covering and closing the central openings in the pans, substantially as described.

3. In drying apparatus the combination of a pan provided with a steam-space next to the bottom and a discharge-opening at or near its periphery, a rotary sweep within the pan, adapted to move the material to be dried from the center outward, and a ring mounted upon said sweep around its center and constructed and arranged to direct the material fed into it against the bottom of the pan, substantially as described.

4. In drying apparatus the combination of a horizontal pan provided with a closed steam-space next to the bottom and a discharge-opening at or near its periphery and a sweep arranged to move the material to be dried from the center outward and provided around the center with a horizontal ring having inclined flights arranged to direct the material outwardly underneath it against the bottom of the pan, substantially as described.

5. In drying apparatus the combination of a series of pans arranged one above another and each provided with a closed steam-space next to the bottom, a central opening through the bottom and a discharge-opening at or near its periphery, a vertical shaft passing loosely through the central openings in said pans, sweeps having a vertically-movable rotating connection with said shaft and bearing on the bottoms of the pans and conduits arranged to conduct the material from the discharge-opening of each of the upper pans to the center of the pan next below, substantially as described.

6. In drying apparatus the combination of a series of pans arranged one above another and each provided with a steam-space next to the bottom and a discharge-opening at or near its periphery, a vertical shaft passing freely through central openings in said pans, sweeps having vertically-movable rotating connections with said shaft and bearing on the bottoms of the pans, and a conduit provided with a conveyer extending from the discharge-opening of one pan toward the center of the pan next below, substantially as described.

7. In drying apparatus the combination of a series of pans arranged one above another and each having a closed steam-space next to the bottom, a central opening in the bottom through the steam-space and a discharge-opening at or near its periphery provided with an adjustable gate or valve, sweeps constructed and arranged to move the material from the center toward the periphery of the pans, a vertical shaft passing freely through central openings in the pans and connected with said sweeps, the hubs of the sweeps covering and closing the central openings in the pans, substantially as described.

8. In drying apparatus the combination of a series of pans arranged one above another and each having a closed steam-space next to the bottom and a discharge-opening at or near its periphery, sweeps having adjustable flights for moving the material from the center toward the periphery of the pans, and a vertical shaft passing through central openings in the pans and connected with said sweeps, the hubs of the sweeps covering and closing the central openings in the pans, substantially as described.

9. In drying apparatus the combination of a series of pans arranged one above another and each having a closed steam-space next to the bottom, and a discharge-opening at or near its periphery, sweeps arranged to move the material from the center toward the periphery of the pans, a vertical shaft passing freely through central openings in the pans and having vertically-movable rotating connections with said sweeps, conduits leading from each of the discharge-openings of the upper pans toward the center of the pan next below, and an inlet spout or conduit arranged to deliver the material to the central part of the upper pan, substantially as described.

In witness whereof we hereto affix our signatures in presence of two witnesses.

JOHN OLSEN.
ELWIN I. NOXON.

Witnesses as to John Olsen:
JNO. M. SCHAUPP,
KARL ISACHSEN.

Witnesses as to Elwin I. Noxon:
M. WOODS,
D. S. BRACKETT.